Patented Mar. 9, 1943

2,313,386

UNITED STATES PATENT OFFICE 2,313,386

PROCESS FOR CONCENTRATION AND EXTRACTION OF ACETIC ACID IN AQUEOUS SOLUTIONS

Jean Lévesque, Montreal, Quebec, Canada

No Drawing. Application February 8, 1941, Serial No. 377,958

2 Claims. (Cl. 260—541)

This invention has for its object to provide an improved and more efficient process for concentration and extraction of acetic acid from its aqueous solutions, by the particular action of tributylamine under definite conditions. Pure tributylamine is a colorless liquid, very slightly soluble in water, with basic properties, has a distillation point of about 214° C. at 760 mm. and a specific gravity of 0.77 at 20° C. Its chemical formula is $(C_4H_9)_3N$.

I have discovered that tributylamine combines more or less completely with acetic acid in aqueous solution, giving tributylamine monoacetate or tributylamine diacetate or a mixture of both acetates depending on temperature, pressure, dilution of acetic acid and amount of tributylamine added.

If the acetic aqueous solution is cold and very dilute and if tributylamine is added in equimolecular ratio or in excess thereof to acetic acid, the reaction is practically complete and only tributylamine monoacetate results in that solution; but if the solution is substantially less dilute or less cold, a part of monoacetate is transformed into diacetate with liberation of tributylamine which floats at the surface of the solution. On the other hand, this diacetate is subject to a slight hydrolysis thus leading to reformation of some monoacetate with liberation of acetic acid. Consequently, there is an equilibrium between those two forms of acetates in aqueous solution.

If tributylamine is added in less than equimolecular ratio to acetic acid in aqueous solution, generally speaking, there is more diacetate and more free acetic acid than if tributylamine had been added in equimolecular ratio.

Tributylamine combines with anhydrous acetic acid and gives only tributylamine diacetate whatever may be the amount of tributylamine added. This diacetate distills without decomposition under well reduced pressure, but by distillation under atmospheric pressure it splits partially into acetic acid and tributylamine.

Consequently, when a cold and dilute aqueous solution of acetic acid to which has been previously added tributylamine in equimolecular ratio to acetic acid, is submitted to distillation under well reduced pressure, water distills first practically free of acetic acid and the monoacetate of tributylamine is progressively transformed in diacetate with liberation of tributylamine which floats at the surface of the solution as being practically insoluble in it; and as its vapor pressure under those conditions is substantially high, tributylamine distills with water in large amounts.

On the other hand, the diacetate thus produced is subject to a slight hydrolysis leading to reformation of monoacetate with liberation of acetic acid. This hydrolysis, however, is always slight if the distillation is conducted under well reduced pressure, that is, at low temperature; furthermore, the high vapor pressure and the basic properties of tributylamine floating at the surface of the solution prevent most of the free acetic acid from distilling with water.

When the distillation of water from the solution is almost completed, practically all the monoacetate has been transformed into diacetate. The temperature rises now very quickly, and if the distillation is conducted under well reduced pressure, this diacetate distills without decomposition leaving as residue a certain amount of tributylamine which may be used for another extraction. The diacetate is now redistilled, but at this time under atmospheric pressure; under these conditions, it splits partially into acetic acid and tributylamine. However, as the distillation point of acetic acid is well below those ones of diacetate and tributylamine, it is easy to allow acetic acid to escape alone in a fractionating column; thus the decomposition of diacetate becomes more and more complete and finally at the top of the column pure acetic acid is recovered while unaltered tributylamine is found as residue in the still, practically free of acetic acid.

From the industrial point of view it is quite evident that the recovery of tributylamine should be almost quantitative in order that this process should become practical. This is possible for the following reasons:

(1) Part of tributylamine goes to distillation with water and traces of acetic acid. By adding to this aqueous distillate a slight excess of a cold dilute aqueous solution of sodium hydroxide in order to completely neutralize those traces of acid, tributylamine is practically entirely removed from that distillate and floats on the surface. It may therefore be recovered by decantation.

(2) Part of the tributylamine is found as residue in the fractionating still and part as residue after distillation of the diacetate under reduced pressure. Generally speaking, that tributylamine has not suffered any alteration and may be used immediately for another extraction.

(3) Pure acetic acid at the top of the fractionating column does not contain tributylamine from the practical point of view.

(4) No tributylamine may go to the vacuum pump if a suitable gas washing apparatus containing cold dilute acetic acid is connected between the vacuum pump and the receiver of the distillate.

(5) In a non-continuous system any part of the apparatus may be washed with cold dilute acetic acid in order to completely remove tributylamine from this apparatus.

The fact that tributylamine is found unaltered after extraction of acetic acid, even from such complex solutions as pyroligneous acid, is due to the following reasons.

Tributylamine is a tertiary amine bearing in its constitution no other functional groups than the tertiary amine group. Being such, it is hardly susceptible generally speaking, of substitution or even addition reactions with other organic compounds such alcohols, aldehydes, ketones, phenols etc. Moreover, as it does not contain hydroxyl groups it is not susceptible of substitution reactions with acids leading to esthers.

Finally, its boiling point, 214° C. at 760 mm., is high enough to allow the decomposition of diacetate under atmospheric pressure and low enough to allow the distillation of diacetate without alteration under well reduced pressure and to impede destructive distillation and unavoidable reactions with other organic compounds at too high temperature. In fact, even with acetic solutions of high complexity such as pyroligneous acid, the loss in tributylamine due to chemical reactions are practically insignificant.

In summarizing the invention, it may be said that this process is based on: (1) The basic properties of tributylamine. (2) Its very slight solubility in water. (3) Its relatively high vapor pressure under definite conditions. (4) The equilibrium which occurs between monoacetate and diacetate. (5) The distillation of diacetate without decomposition under well reduced pressure. (6) The decomposition of diacetate by distillation under atmospheric pressure. (7) On the great stability of tributylamine throughout the process even in the presence of very complex solutions.

The homologues of acetic acid such as formic, propionic and butyric acids give rise to similar phenomena with tributylamine and they may be extracted together with acetic acid in a similar process. However, the tributylamine diformate is not decomposed by distillation under atmospheric pressure and when an aqueous solution of acetic acid contains formic acid, it is advisable to wash the residual tributylamine after extraction, with a cold dilute aqueous solution of sodium hydroxide in order to remove formic acid and insure a complete recovery of tributylamine.

Other tertiary amines, containing no other functional groups than the tertiary amine group and substantially insoluble in water, such as triamylamine, give rise to similar phenomena with acetic acid, but the loss in acetic acid is much higher. Of course the various isomers of tributylamine react with acetic acid similarly to normal tributylamine. This is also true of halogenated compounds of tributylamine.

The outlines of the process having been described, we will now describe a particular example of this process in accordance with those principles.

2500 cc. of crude pyroligneous acid are distilled under atmospheric pressure. The first 400 cc. are collected apart to be fractionated in order to extract methyl alcohol, acetone and light oils. The demethanolised distillate represents 350 cc. Distillation of pyroligneous acid is continued until the thermometer indicates 120°; it is then stopped, soluble tar remaining as residue. 1850 cc. of distillate are thus obtained to which are added the demethanolised 350 cc. of the first portion. Total acidity of these 2200 cc. of distilled pyroligneous acid is 10%, calculated as acetic acid. 915 cc. of tributylamine, or about 3.2 parts by weight (equimolecular) in relation to acetic acid, are then added to the 2200 cc. and the mixture is agitated for a few seconds; practically all of the tributylamine goes into solution with aqueous acetic acid. This solution is now submitted to distillation under an absolute pressure of 100 mm. corresponding to a boiling point of water of 52° C. Distillation is stopped at about 70° C. 1975 cc. of aqueous distillate are thus obtained and 240 cc. of tributylamine float at the surface of this distillate. The total acidity of distillate calculated as acetic acid is 0.15%. Consequently the loss of acetic acid is about 1.4%. 50 cc. of cold 5% sodium hydroxide solution are then added to this aqueous distillate which is allowed to settle for 12 hours. After that time decantation is effected and 13 cc. of tributylamine are thus recovered.

The water-free solution containing tributylamine diacetate is now distilled under an absolute pressure of 20 mm. and practically no distillate appears before the temperature rises to 80° C. Distillation then begins and is continued until the thermometer indicates 110° C. It is then stopped, the residue being tributylamine more or less pure but containing only traces of acetic acid.

This tributylamine is shaken with 25 cc. of a 5% cold sodium hydroxide aqueous solution and allowed to settle for 12 hours. It is then decanted and 197 cc. of tributylamine are thus recovered.

The distillate of tributylamine diacetate represents about 640 cc. It is now transferred to a fractionating column and distillation is effected under atmospheric pressure. The temperature in the still stands at about 165° C., but at the top of the column thermometers indicates 117° C. and pure acetic acid passes. If the acid is well recovered all along the column, 206 cc. of total acetic acid are obtained. Tails of distillate contain propionic and butyric acid, while heads contain a few esters and, sometimes, a small quantity of formic acid. In fact 97.5% of total acids in the initial pyroligneous acid are recovered in anhydrous state.

The residue is tributylamine practically free of acetic acid which may be returned for another extraction. Or it may be washed with a 5% cold aqueous solution of sodium hydroxide, allowed to settle for 12 hours and decanted. 461 cc. of tributylamine are thus recovered. Consequently the total recovery of tributylamine is about of 99.6%. And it seems that in a long continuous process, this recovery should be even substantially more complete.

Of course, this process such as described is susceptible of many variations. For example, in industry, it is quite evident that the vapors from crude pyroligneous acid, in the first distillation, would enter in coils laid at the bottom of the vacuum kettle where a charge of pyroligneous acid previously distilled is submitted to distillation under reduced pressure, with tributylamine. Considerable heating would there be saved. This previous distillation may be omitted, but in view of the purity of final products and recovery of tributylamine it is highly advisable to undertake it, in the case of pyroligneous acid.

Distillation under reduced pressure may be conducted at various perssures, even at atmospheric pressure, but then the loss in acetic acid is higher, standing at about 10%, for a 10% solution. The distillation under too high vacuum is very objectionable from the practical point of view. It may however be undertaken.

The residual tributylamine obtained in the fractionating column may be transferred immediately for another extraction. It is however highly advisable to purify it from time to time, by washing with a cold and dilute aqueous solution of sodium hydroxide. This is also true of tributylamine recovered as a residue in the vacuum kettle.

The distillation of diacetate under reduced pressure may be omitted, but in view of the purity of acetic acid and recovery of tributylamine it is generally advisable to undertake it.

The distillation performed after the addition of the tributylamine may be supplied with heat from vapors at 100° C. evolved in the distillation of another batch of pyholigneous acid at atmospheric pressure.

Although specified ingredients and proportions thereof have been named it will be understood that the invention is susceptible of modification within the legal range of equivalents as well as those equivalents specifically mentioned herein.

What I claim is:

1. A process for concentrating aqueous acetic acid comprising adding more than two parts by weight of tributylamine for each part of acetic acid, driving off the water from the solution by distillation under an absolute pressure of less than 780 mm. adding to the aqueous distillate an alkaline reacting compound capable of neutralizing acetic acid, in an amount sufficient to render the resulting solution alkaline, allowing the solution to settle, decanting and recovering the settled tributylamine from the solution, distilling the water-free tributylamine diacetate without decomposition under an absolute pressure of less than 760 mm. until the residue contains practically no acetic acid, recovering the residual tributylamine, distilling the tributylamine diacetate under atmospheric pressure in a fractionating column, recovering the acetic acid thus extracted and the tributylamine remaining in the fractionating still.

2. A process for concentrating and extracting acetic acid from pyroligneous acid comprising distillating pyroligneous acid under atmospheric pressure, until the residue consists of soft soluble tar, separating and fractionating heads of distillate in order to remove methyl alcohol, acetone and light oils adding to the distillate of about 3.2 parts by weight of tributylamine for each part of acetic acid contained in the distillate, distilling this distillate under an absolute pressure of about 100 mm., heat being supplied by vapors at 100° C. from another batch of pyroligneous acid distilling at atmospheric pressure, this distillate consisting mostly of water with a small amount of tributylamine, and being almost free of acetic acid which remains in the solution mostly in the combined state and, as the distillation proceeds, is gradually transformed into tributylamine diacetate, neutralizing and slightly alkalinising the distillate thus obtained with a cold and dilute aqueous solution of sodium hydroxide, allowing it to settle for about 24 hours and then decanting the floating tributylamine, distilling the water-free tributylamine diacetate under an absolute pressure of about 40 mm., until the temperature reaches about 110° C., recovering the tributylamine then remaining as residue, redistilling the tributylamine diacetate under atmospheric pressure in a fractionating column, recovering heads and medium fractions consisting of pure acetic acid, and tails thus obtained, separating those fractions, and finally recovering tributylamine left as a residue in the fractionating still when the temperature reaches about 210° C.

JEAN LÉVESQUE.